United States Patent [19]

Coran et al.

[11] 4,338,413

[45] Jul. 6, 1982

[54] POLYMER BLENDS

[75] Inventors: Aubert Y. Coran; Raman Patel, both of Akron, Ohio

[73] Assignee: Monsanto Company, St. Louis, Mo.

[21] Appl. No.: 197,387

[22] Filed: Oct. 16, 1980

[51] Int. Cl.³ ............................................. C08L 77/00
[52] U.S. Cl. .................................... 525/179; 525/65; 525/66
[58] Field of Search ...................... 525/179, 66, 65, 69

[56] References Cited

U.S. PATENT DOCUMENTS

| | | | |
|---|---|---|---|
| 3,373,222 | 3/1968 | Armstrong | 525/179 |
| 3,484,403 | 12/1969 | Brunson et al. | 260/23 |
| 3,546,319 | 12/1970 | Prevorsek | 525/179 |
| 3,879,492 | 4/1975 | Bontinick | 525/179 |
| 4,104,210 | 8/1978 | Coran et al. | 260/4 R |
| 4,130,535 | 12/1978 | Coran et al. | 260/33.6 |
| 4,173,556 | 11/1979 | Coran et al. | 260/30.8 |
| 4,206,096 | 6/1980 | Takagi | 525/179 |
| 4,251,644 | 2/1981 | Joffrion | 525/66 |

FOREIGN PATENT DOCUMENTS

| | | | |
|---|---|---|---|
| 9757 | 4/1980 | European Pat. Off. | 525/66 |
| 2758568 | 7/1979 | Fed. Rep. of Germany | 525/66 |
| 55-123639 | 9/1980 | Japan | 525/179 |
| 55-123640 | 9/1980 | Japan | 525/179 |

OTHER PUBLICATIONS

J. App. Poly. Sci., vol. 18, pp. 963–974, (1974), Fumio Ide and Akira Hasegawa, "Studies on Polymer Blend of Nylon 6 and Polypropylene or Nylon 6 and Polystyrene Using the Reaction of Polymer".

*Primary Examiner*—Paul Lieberman
*Attorney, Agent, or Firm*—Larry R. Swaney

[57] ABSTRACT

Thermoplastic blends comprising mixtures of dissimilar plastics and dissimilar rubbers are described; they are improved by incorporation of functionalized olefin polymer.

15 Claims, No Drawings

POLYMER BLENDS

This application relates to improved polymer blends, and more particularly, to blends of mixtures of plastics with mixtures of rubbers.

BACKGROUND OF THE INVENTION

It is known that a modified polypropylene is more compatible with nylon than an unmodified polypropylene. U.S. Pat. No. 3,484,403 and J. App. Poly. Sci., Vol. 18, pp. 963–974. Thermoplastic elastomeric compositions comprising blends of polypropylene and cured hydrocarbon rubbers (e.g., U.S. Pat. Nos. 4,104,210 and 4,130,535) and those comprising blends of nylon and cured nitrile rubber (U.S. Pat. No. 4,173,556) are known.

It was postulated that mixing a blend of polypropylene and cured hydrocarbon rubber with a blend of nylon and cured nitrile rubber would give a composition having properties that neither of the individual blends possessed alone. For example, the multicomponent blend would exhibit better oil resistance than the polypropylene/hydrocarbon rubber blend and better heat aging than the nylon/nitrile rubber blend. However, when such a mixture was prepared, the resulting composition exhibited poor stress-strain properties, especially low strength and low elongation. If the stress-strain properties could be improved, then valuable compositions would be obtained.

SUMMARY OF THE INVENTION

It has now been discovered that a valuable thermoplastic composition comprising a blend of plastics and cured rubbers, in which the plastics are crystalline polyolefin polymer and nylon and in which the rubbers are a cured particulate hydrocarbon rubber and a cured particulate polar rubber, is obtained by the incorporation therein, of a functionalized olefin polymer in an amount sufficient to improve the compatibility between the crystalline polyolefin polymer and nylon.

The properties of the compositions of the invention vary depending upon the relative proportions of plastic and cured rubber. Blends containing high proportions of plastic are moldable, rigid thermoplastic compositions exhibiting improved strength and greater toughness or impact resistance. Blends containing high proportions of cured rubber are elastoplastic, i.e., they exhibit elastomeric properties and, yet, are processable as thermoplastics. The relative proportions of plastic and cured rubber to give thermoplastic compositions cannot be defined with precision because the limits vary depending upon a number of factors, such as, the kind of plastic or rubber, the presence of plasticizer and other ingredients, and the extent the rubber is cross-linked. However, generally, blends of the invention comprise about 20 to 98 parts by weight of plastic, and correspondingly, about 80 to 2 parts by weight of cured rubber. Typically, the plastic comprises about 10–90 parts by weight of crystalline polyolefin polymer, and correspondingly, about 90–10 parts by weight of nylon; and the cured rubber comprises about 10–90 parts by weight of hydrocarbon rubber, and correspondingly, about 90–10 parts by weight of polar rubber. Compositions comprising about 25 to about 65 parts by weight of plastic, and, correspondingly, about 75 to about 35 parts by weight of cured rubber are preferred. An amount of functionalized olefin polymer which is sufficient to improve the compatibility between the crystalline polyolefin polymer and nylon is satisfactory for the compositions of the invention. Improved compatibility is generally indicated by an increase in elongation or tensile strength or both. An increase in elongation of 25%, preferably 50% or more, indicates improved compatibility. The amount of functionalized olefin polymer required is readily determined by incrementally increasing the amount of functionalized olefin polymer in the blend until the improved properties are observed. Generally, at least 0.5 part by weight of functionalized olefin polymer per 100 parts by weight of crystalline polyolefin polymer is enough to observe an improvement in compatibility. Typically, the amount of functionalized olefin polymer is about 0.5 to 20 parts by weight per 100 parts by weight of crystalline polyolefin polymer and nylon combined. Increasing the amount of functionalized olefin polymer within this range usually increases compatibility. Of course, it is understood that the functionalized olefin polymer may replace all of the crystalline polyolefin polymer, if desired, but the improvement in properties may not be substantially greater than what is obtained by the use of lesser quantities of functionalized olefin polymer.

A composition of the invention may be prepared by first separately preparing a blend of polyolefin resin and cured particulate hydrocarbon rubber and a blend of nylon and cured particulate polar rubber. Each of these blends may be prepared in accordance with U.S. Pat. Nos. 4,104,210, 4,130,534, 4,130,535, 4,173,556, 4,183,876, 4,197,379, 4,203,884, and 4,207,404, the disclosures of which are incorporated herein by reference. The two independently prepared blends are then melt mixed together with functionalized olefin polymer in conventional mixing equipment to obtain a composition of the invention. Alternatively, a blend of crystalline polyolefin polymer, functionalized olefin polymer and cured hydrocarbon rubber is prepared by dynamic vulcanization (masticating the mixture with rubber curative above the melting point of the polyolefin polymer until the rubber is cured). The crystalline polyolefin polymer can be entirely replaced by functionalized crystalline olefin polymer. The blend containing functionalized olefin polymer is then melt mixed with a blend of nylon and cured particulate polar rubber to obtain a composition of the invention.

A functionalized olefin polymer suitable for the practice of the invention is an olefin polymer containing at least one functional group that has a physical or chemical affinity for nylon. Examples are epoxy, carboxy, amino, amido, or methylol phenolic groups. A functionalized olefin polymer may be prepared by known techniques and some are commercially available. For example, functional groups may be provided during polymerization by copolymerizing an olefin and an unsaturated carboxylic acid. Alternatively, functional groups may be introduced by direct reaction with the polymer by known grafting reactions.

Generally, the amount of graft forming functionalizing agent is used at a rate of about 0.5 to 20 parts by weight per 100 parts by weight of olefin polymer, but preferably the amount does not exceed 10 weight percent of the olefin polymer. It can, however, be considerably lower with amounts in the vicinity of 0.1 percent being enough to enhance the compatibility of crystalline polyolefin polymer and nylon.

A suitable functionalized olefin polymer may be conveniently prepared by masticating an olefin polymer, preferably at a temperature above its melting point with 0.1 to 20 weight percent of reactant which will graft at least one functional group selected from the group consisting of epoxy, carboxy, amino, amido, or methylol phenolic radical onto the polymer molecule. Generally, grafting is carried out for 1–20 minutes in the presence of a catalyst which promotes the reaction. An example of a satisfactory catalyst is a Lewis acid or a peroxide. A suitable functionalized olefin polymer may be prepared by causing an unsaturated carboxylic acid such as acrylic or methacrylate acid, maleic acid, anhydride, or ester, or N-substituted maleamic acid, to react in the presence of a free radical generator with olefin polymer, by known processes. For example, see U.S. Pat. No. 2,973,344. Suitable functionalized olefin polymer may also be prepared by causing a methylol phenolic resin to react with olefin polymer in the presence of a Lewis acid.

Olefin polymers suitable for functionalization comprise amorphous or crystalline, essentially saturated homopolymers or copolymers of $C_2$–$C_8$ alpha monoolefins. Thermoplastic crystalline olefin polymers are especially preferred for functionalization. An important subgroup of olefin polymers comprises high molecular weight solid products from the polymerization of one or more monoolefins by either high pressure or low pressure processes. Examples of such polymers are the isotactic or syndiotactic monoolefin polymers, representative members of which are commercially available. Satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin polymers, such as polyethylene, polybutene-1, and polypropylene, or mixtures thereof, may be advantageously used in the practice of the invention with polypropylene being preferred. Also suitable for the practice of the invention are copolymers of two or more olefins with copolymers of ethylene and propylene being preferred.

Both fiber-forming and molding grade nylons are suitable for the practice of the invention. Examples of satisfactory nylon are described in U.S. Pat. No. 4,173,556, Column 7, lines 4-30, the disclosure of which is incorporated herein by reference. Nylons melting at about 230° C. or below are preferred, such as, Nylon 6, Nylon 6-6,6 copolymer, Nylon 6-9 copolymer, Nylon 6-12 copolymer, Nylon 6-6,6-10 terpolymer, Nylon 11 and Nylon 12.

Any methylol phenolic material which will form a graft with olefin polymer may be used in the practice of the invention. Suitable methylol phenolic material may be prepared by condensation of unsubstituted phenol, a $C_1$–$C_{10}$ alkyl-p-substituted phenol, or halogen substituted phenol with an aldehyde, preferably, formaldehyde in an alkaline medium, or by condensation of phenol dialcohols. Methylol phenolic material includes polymeric phenols containing up to 10 benzene rings but preferred materials contain no more than three benzene rings. Especially preferred are methylol phenolic materials derived from dimethylol phenol substituted with $C_5$–$C_{10}$ alkyl groups preferably tertiary alkyl groups in the para position. Examples of satisfactory dimethylol phenolic materials are described in U.S. Pat. Nos. 2,972,600, 3,093,613, 3,287,440, 3,709,840, and 3,211,804, Column 5, lines 3-67, the disclosures of which are incorporated herein by reference. Halogenated, for example brominated, methylol phenolic materials are also suitable. These halogenated materials release, at elevated temperatures, hydrogen halide, which in the presence of a metal oxide such as zinc oxide, serves as an acidic activator. Suitable methylol phenolic materials are commercially available; for example, they may be purchased under the trade names of SP-1045, SP-1055, SP-1056, CRJ 352, and certain Arofene resins.

Any catalyst which promotes the graft formation between olefin polymer and methylol phenolic material is suitable for the practice of the invention. Preferred activators are Lewis acids which include the acid-acting metal halides such as boron trifluoride, stannous chloride, zinc chloride, titanium tri- or tetrachloride, aluminum chloride, ferric chloride, ferric bromide, zinc bromide, aluminum bromide or complexes thereof. Suitable Lewis acids are described in U.S. Pat. No. 4,121,026, Columns 5-6, the disclosure of which is incorporated herein by reference.

Suitable polar rubbers are oil-resistant nonhydrocarbon, (i.e., they contain chlorine, oxygen, sulfur or nitrogen heteroatoms) rubbery polymers. Examples of suitable polar rubbers are nitrile rubber, urethane rubber, ethylene vinylacetate (EVA) rubber, epichlorohydrin rubber, chlorinated polyethylene rubber, chlorosulfonated rubber, and acrylic acid-ester copolymer rubber. For examples of suitable polar rubbers see U.S. Pat. Nos. 4,116,914, 4,141,863, and 4,173,556. Nitrile rubber is preferred which comprises rubbery polymer of 1,3-butadiene or isoprene and acrylonitrile. Preferred nitrile rubbers comprise polymers of 1,3-butadiene and about 15–45 weight percent acrylonitrile.

Suitable hydrocarbon rubbers comprise rubbery polymers of olefins comprising essentially carbon and hydrogen (as contrasted from rubber polymers containing substantial quantities of heteroatoms). Examples of suitable hydrocarbon rubbers are natural or synthetic polyisoprene rubber, styrene-butadiene rubber, polybutadiene rubber, polyisobutylene rubber, ethylenepropylene rubber and ethylene-propylene diene terpolymer rubber (EPDM rubber). For examples of suitable hydrocarbon rubbers, sse U.S. Pat. Nos. 4,104,210, 4,130,534, and 4,130,535.

Improved blend compositions of the invention can be used to form a variety of molded, extruded, or calendered articles. The properties of the blend depend upon the proportions of the components in the blend with a wide range of properties being available simply by varying the proportions of the blend components.

The stress-strain properties of the composition are determined in accordance with ASTM test procedures. Tests carried out using a Microdumbbell tensile test specimen (ASTM D1708-66) having a test length of 0.876 inches (2.23 cm.). A tensile tester is used to pull the specimens apart during the test for tensile strength and ultimate elongation. The tester is designed to measure changes in jaw separation in inches. Though the initial jaw separation was adjusted, according to the ASTM procedure, to 0.90 inches (2.29 cm.) and the specimen length and jaw separation are not 1.00 inches (2.54 cm.), the elongation at break was read as the jaw separation increase, in inches. The percent ultimate elongation or elongation at break was calculated by multiplying the change in jaw separation required to break the specimen (measured in inches) by 100. It is true that the original unstrained sample length was 0.876 inches (not 1.00 inch) and one might expect that the change (in inches) in jaw separation should be divided by 0.876 inches as well as being multiplied by 100.

However, it is also true that some flow of the specimen occurs in the jaws, which flow, in effect, somewhat increases the initial or unstrained length. Since the effective length change due to flow of the specimen in the jaws is difficult to measure in each case, and since the effect of this is in the opposite direction of not dividing by 0.876, it was found expedient to estimate the percent ultimate elongation or elongation at break, merely by multiplying the jaw separation at break (measured in inches) by 100. The actual value may deviate from this somewhat; however, the method presented herewith is incorporated into the definition for percent elongation used herein. Test specimens are pulled at 2.5 cm. per minute up to 30 percent elongation and 25.4 cm. per minute to failure. True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation.

DESCRIPTION OF THE PREFERRED EMBODIMENTS

A thermoplastic elastomeric composition is prepared by dynamic vulcanization as described in U.S. Pat. No. 4,103,535, except a phenolic curative is used. The thermoplastic elastomeric composition comprises (all parts by weight) 50 parts of EPDM rubber (Epsyn 70A), and 50 parts of polypropylene (Profax 6723). Five parts of phenolic curing resin, SP-1045, and one part of cure activator, $SnCl_2 \cdot 2H_2O$, are used to cure the rubber. The composition is designated as EPDM/PP blend in the tables.

A thermoplastic elastomeric composition is prepared by dynamic vulcanization as described in U.S. Pat. No. 4,173,556, by the use of a self-curing nitrile rubber containing 33% acrylonitrile with the extent of cure supplemented by use of a phenolic curative. The thermoplastic elastomeric composition comprises (all parts by weight) 65 parts of nitrile rubber (Hycar 1092-80), and 35 parts of Nylon 6/66 copolymer. Curative, 1.3 parts of phenolic curing resin, SP-1045, and 0.65 part of titanium dioxide and 2 parts of antidegradant are also included in the composition. The composition is designated as NBR/Nylon blend in the tables.

Maleic acid modified polypropylene is prepared by melt-mixing at about 180° C. and at about 80 rpm in a Brabender mixer, 100 parts by weight of polypropylene (Profax 6723) and 5 parts by weight of maleic acid. After they are thoroughly mixed, 1 part by weight of 2,5-dimethyl-2,5-bis(t-butylperoxy)hexane (90% active), (Lupersol ® 101) is added. Mixing is continued until the falling consistency or mixing torque levels off (about 3 minutes) and, thus, indicates that reaction is complete. A carboxylated polypropylene (olefin polymer containing carboxy functional groups) is obtained and is designated as MA-modified PP in Table 1.

To prepare polypropylene having methylol phenolic groups grafted thereto, 100 parts of polypropylene (Profax 6723) are charged to a Brabender mixer with cam type rotors and masticated at 80 rpm with an oil bath temperature of about 190° C. After the polypropylene is molten, 4 parts of dimethylol-p-octylphenol (SP-1045) are added and mixing is continued for 2 minutes. Activator, 0.8 parts of stannous chloride dihydrate, is then added and mixed for 3 more minutes. Lastly, 0.32 parts of magnesium oxide is added (to neutralize any free acid) and the batch is mixed for one additional minute. The mass is then removed and passed through a mill to form a sheet. The functionalized olefin polymer containing methylol phenolic radicals is designated as phenolic modified PP in Table 1. The temperature of the stock during mixing is 190° C.

Olefin polymer is also modified by both a substituted maleamic acid or methylol phenolic compound by melt mixing at about 185° C., 100 parts by weight of olefin polymer and 5 parts by weight of N-(carboxymethyl)-maleamic acid (CMMA). After they are thoroughly mixed, 0.64 parts by weight of organic peroxide (Lupersol ® 101) is added. After about 4-5 minutes, 5 parts by weight of dimethylol-p-octylphenol are added and mixing is continued for 2 more minutes. The composition is then removed and cooled. Composition prepared with polypropylene is designated CMMA-phenolic mod. PP in Table 1, and a composition prepared with ethylene-propylene copolymer rubber, EP, (Vistalon 606), is designated CMMA-phenolic mod. EP in Table 1.

Blend compositions are prepared which contain the ingredients in Table 1 (all parts by weight). The ingredients are melt-mixed in a Brabender mixer at about 220° C. until the nylon is melted and for 3 minutes thereafter. The compositions are removed, then returned to the mixer and remixed for one additional minute. The compositions are compression molded at 250° C. The properties are shown in Table 1.

Stock 1 is a control containing unmodified polypropylene (PP). Stock 5 is a control containing unmodified ethylene propylene copolymer (EP). Stocks 2-4 and 6 illustrate improved compositions of the invention. The data show that the incorporation of functionalized olefin polymer results in substantial improvement to both tensile strength and elongation. True stress at break, TSB, shows a 2 to 3 fold increase over the controls.

Compositions of the invention are illustrated in Table 2 in which a portion or all of the polyolefin resin of an EPDM rubber blend is replaced by functionalized olefin polymer prior to dynamic vulcanization and before mixing with a nylon-cured nitrile rubber blend. The EPDM rubber, nitrile rubber, polypropylene, nylon, CMMA modified polypropylene and phenolic modified polypropylene are the same as before. Stock 1 is a control consisting of a 50/50 blend of a blend of polypropylene cured EPDM rubber and a blend of nylon-cured nitrile rubber. Each of the blends is individually prepared by dynamic vulcanization as described above. In Stock 2, 25 weight percent of the polypropylene is replaced by CMMA modified polypropylene before the polypropylene-EPDM rubber blend is cured by dynamic vulcanization. In Stock 3, all of the polypropylene in the EPDM rubber blend is phenolic-modified polypropylene. The data show that the presence of phenolic modified polypropylene results in substantial improvements in tensile strength, elongation and true stress at break. This is indicative of the improved compatibility of the blend components.

TABLE 1

|  | 1 | 2 | 3 | 4 | 5 | 6 |
|---|---|---|---|---|---|---|
| EPDM/PP Blend | 50 | 50 | 50 | 50 | 50 | 50 |
| NBR/Nylon Blend | 50 | 50 | 50 | 50 | 50 | 50 |
| PP | 10 | — | — | — | — | — |
| MA-Mod. PP | — | 10 | — | — | — | — |
| Phenolic Mod. PP | — | — | 10 | — | — | — |
| CMMA-Ph. Mod. PP | — | — | — | 10 | — | — |
| EP | — | — | — | — | 10 | — |
| CMMA-Ph. Mod. EP | — | — | — | — | — | 10 |

TABLE 1-continued

|  | 1 | 2 | 3 | 4 | 5 | 6 |
|---|---|---|---|---|---|---|
| Properties |  |  |  |  |  |  |
| TS, MPa | 13.1 | 25.0 | 19.3 | 20.4 | 9.8 | 18.0 |
| $M_{100}$, MPa | 11.6 | 14.2 | 13.6 | 13.0 | 9.2 | 12.4 |
| E, MPa | 211 | 192 | 208 | 158 | 111 | 132 |
| Elong., % | 200 | 350 | 280 | 320 | 140 | 300 |
| Tension Set, % | 36 | 43 | 42 | — | 25 | 39 |
| TSB, MPa | 39 | 112 | 73 | 86 | 24 | 72 |

TABLE 2

|  | 1 | 2 | 3 |
|---|---|---|---|
| NBR/Nylon Blend | 50 | 50 | 50 |
| EPDM/PP Blend | 50 | — | — |
| EPDM/CMMA Mod. PP/PP | — | 50 | — |
| EPDM/Phenolic Mod. PP | — | — | 50 |
| Properties |  |  |  |
| TS, MPa | 11.5 | 20.9 | 21.2 |
| $M_{100}$, MPa | 9.7 | 12.3 | 11.3 |
| E, MPa | 94 | 128 | 140 |
| Elong., % | 180 | 310 | 360 |
| Tension Set, % | 24 | 35 | 34 |
| TSB, MPa | 32 | 86 | 98 |

Compositions of the invention comprising different polar rubbers are illustrated in Table 3. The EPDM rubber/PP blend, polypropylene, and MA-modified polypropylene are the same as in Table 1. The nylon in Stocks 1-4 is Nylon 6/66, m.p. 213° C. and nylon of Stocks 5-8 is Nylon 6/66/610, m.p. 163° C. Each of the blends is individually prepared by dynamic vulcanization. The Vamac/nylon blend of Stocks 1 and 2 contains 45 parts by weight of nylon, 67.65 parts by weight of Vamac N-123 acrylic rubber masterbatch, and 1.1 magnesium oxide curative. The Vamac N-123 masterbatch contains 100 parts by weight of acrylic acid-ester copolymer rubber and 23 parts by weight of fumed silica, stabilizers, and processing aids. The EVA/nylon blend of Stocks 3 and 4 contains 40 parts by weight of nylon, 60 parts by weight of EVA (ethylene-vinyl acetate) rubber, and curative comprising 0.6 parts by weight of organic peroxide (Lupersole®101) and 1.2 parts by weight of acrylate cross-linking agent (SR 351). The PU/nylon blend of Stocks 5 and 6 contains 50 parts by weight of nylon, 50 parts by weight of polyurethane (PU) rubber, and curative comprising 0.5 part by weight of organic peroxide (L-101) and one part by weight of m-phenylene bismaleimide (HVA-2).

TABLE 3

|  | 1 | 2 | 3 | 4 | 5 | 6 | 7 | 8 |
|---|---|---|---|---|---|---|---|---|
| EPDM/PP Blend | 50 | 50 | 50 | 50 | 50 | 50 | 50 | 50 |
| Vamac/Nylon Blend | 50 | 50 | — | — | — | — | — | — |
| EVA/Nylon Blend | — | — | 50 | 50 | — | — | — | — |
| PU/Nylon Blend | — | — | — | — | 50 | 50 | — | — |
| Hydrin/Nylon Blend | — | — | — | — | — | — | 50 | 50 |
| PP | 10 | — | 10 | — | 10 | — | 10 | — |
| MA-Mod. PP | — | 10 | — | 10 | — | 10 | — | 10 |
| Properties |  |  |  |  |  |  |  |  |
| TS, MPa | 16.1 | 26.9 | 11.2 | 14.0 | 9.2 | 19.6 | 11.9 | 22.0 |
| $M_{100}$, MPa | 14.9 | 16.5 | 10.1 | 12.3 | — | 11.8 | 9.3 | 12.0 |
| E, MPa | 132 | 147 | 114 | 137 | 173 | 157 | 206 | 199 |
| Elong., % | 170 | 310 | 190 | 200 | 73 | 270 | 230 | 340 |
| Ten. Set, % | 40 | 39 | 32 | 35 | — | 52 | 40 | 50 |
| TSB, MPa | 43 | 110 | 32 | 42 | 16 | 72 | 39 | 97 |

The Hydrin/nylon blend of Stocks 7 and 8 contains 50 parts by weight of nylon, 50 parts by weight of epichlorohydrin rubber (Hydrin 400), one part by weight of antidegradant, and curative comprising 0.4 part of sulfur, one part of bis-2-benzothiazolyl disulfide and 1.67 part of zinc stearate (all parts by weight). The stocks are prepared by melt-mixing the components in the indicated proportions in a Brabender mixer until a uniform blend is obtained. Test specimens are prepared by compression molding. The properties are shown in Table 3.

The odd-numbered stocks are controls containing unmodified polypropylene. The even-numbered stocks illustrate compositions of the invention containing maleic acid modified polypropylene which compatibilizes the polypropylene and nylon. The data show that incorporation of functionalized olefin polymer results in substantial improvement in tensile strength, elongation, or both. True stress at break, TSB, shows a substantial increase over the controls.

Although the invention has been illustrated by typical examples, it is not limited thereto. For example, it is envisioned that in blends in which the thermoplastic polyester resin replaces the nylon, the use of functionalized olefin polymer will improve the compatibility between the crystalline polyolefin polymer and polyester so that improved thermoplastic compositions will be obtained. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 20 to 98 parts by weight of plastic, and, correspondingly, about 80 to 2 parts by weight of cured particulate rubber wherein the plastic comprises about 10-90 parts by weight of crystalline polyolefin polymer, and, correspondingly, about 90-10 parts by weight of nylon, and the cured rubber comprises about 10-90 parts by weight of hydrocarbon rubber and, correspondingly, about 90-10 parts by weight of polar rubber, and at least 0.5 part by weight of a functionalized olefin polymer per 100 parts by weight of crystalline polyolefin polymer up to an amount where all of the polyolefin polymer is replaced by functionalized olefin polymer.

2. The composition of claim 1 in which the hydrocarbon rubber is diene rubber or EPDM rubber.

3. The composition of claim 2 in which the polar rubber is nitrile rubber, ethylene vinyl acetate rubber or acrylic acid-ester copolymer rubber.

4. The composition of claim 3 in which the crystalline polyolefin polymer is polyethylene or polypropylene.

5. The composition of claim 4 in which the olefin polymer is polypropylene.

6. The composition of claim 6 in which the polar rubber is nitrile rubber.

7. The composition of claim 6 in which the functionalized olefin polymer contains at least one radical selected from the group consisting of epoxy, carboxy, amino, amido, or methylol phenolic radicals.

8. The composition of claim 7 in which the functionalized olefin polymer is carboxylated polypropylene in an amount of about 0.5 to 20 parts by weight per 100 parts by weight of polyolefin polymer and nylon combined.

9. The composition of claim 8 in which the crystalline polyolefin polymer is crystalline polypropylene and the hydrocarbon rubber is EPDM rubber.

10. The composition of claim 9 in which the nylon melts at about 230° C. or below.

11. The composition of claim 10 in which the nylon is Nylon 6, Nylon 6/66 copolymer or Nylon 6/66/610 terpolymer.

12. The composition of claim 11 in which the cured rubber comprises about 20 to 80 parts by weight of EPDM rubber, and correspondingly, about 80 to 20 parts by weight of nitrile rubber, wherein both the EPDM rubber and nitrile rubber are in the form of discrete dispersed particles no larger than about 50 microns number average.

13. The composition of claim 12 in which the rubber particle size is about 0.2 to about 10 microns.

14. The composition of claim 1 in which the polar rubber is acrylic acid-ester copolymer rubber.

15. The composition of claim 14 comprising about 25 to about 65 parts by weight of plastic, and, correspondingly, about 75 to 35 parts by weight of cured rubber which composition is elastomeric.

* * * * *